June 21, 1966    R. B. MILLER ETAL    3,256,624
FLATWORK SMOOTHING DEVICE

Filed March 2, 1964    7 Sheets-Sheet 2

INVENTOR.
REGAN B. MILLER
ROGER N. ARNAUD
BY SIDNEY LAPHAM

June 21, 1966  R. B. MILLER ETAL  3,256,624
FLATWORK SMOOTHING DEVICE

Filed March 2, 1964  7 Sheets-Sheet 5

INVENTOR.
REGAN B. MILLER
BY ROGER N. ARNAUD
SIDNEY LAPHAM

*Townsend and Townsend*
*attorneys*

United States Patent Office 3,256,624
Patented June 21, 1966

3,256,624
FLATWORK SMOOTHING DEVICE
Regan B. Miller, 3926 Roosevelt St., Richmond, Calif.;
Roger N. Arnaud, 701 Escobar St., Martinez, Calif.;
and Sidney D. Lapham, Alhambra Valley Road, Martinez, Calif.
Filed Mar. 2, 1964, Ser. No. 348,745
11 Claims. (Cl. 38—143)

This invention relates to apparatus for feeding flatwork articles to a flatwork ironer of the type used in commercial laundries in such a way that the articles move into the ironer in a smoth unwrinkled condition.

The present application is a continuation-in-part of copending application for United States Patent Serial Number 189,406 filed April 23, 1962, now abandoned.

The specific embodiment of the present invention to be described hereinafter comprises a flatwork conveyor table having at its output end a flatwork spreader for placement at the input end of a flatwork ironer. The spreader includes first and second endless belts mounted for linear movement along the line normal to the pass line of flatwork being fed into the ironer, a plurality of resilient fingers mounted on each endless belt along the external periphery thereof, and means for rotatably driving the belts so that the upper portion of each belt moves outwardly from the center of the flatwork pass line to enable the resilient fingers to frictionally engage the lower surface of the flatwork, thereby spreading and smoothing the flatwork piece as it is fed into the ironer. Fingers are spaced apart sufficiently so that they whip the trailing end of the flatwork piece, thus removing wrinkles and folds prior to entry into the ironer. The conveyor table which is adapted to intermittently feed flatwork pieces to the spreader has a width at least as great as the length of a bedsheet and is partitioned to permit laundry employees to maintain various groups of laundry separated one from the other. The conveyor is operable by an operator stationed on either side of the spreader.

Flatwork, such as bedsheets or the like, is normally ironed in commercial laundries on a flatwork ironer that has a series of endless belts for conveying the flatwork pieces over heated ironing surfaces. Unless the trailing edge of the flatwork piece is spread and smoothed as it is being drawn into the machine, the finished product will have creases or wrinkles therein. The spreading and smoothing may be effected by stationing an operator on each side of the input end of the ironer to manually guide the flatwork piece and draw the sides of the trailing edge of the piece outwardly as it is being fed into the ironer. In this mode of operation a substantial period elapses between the time the trailing edge of one sheet is drawn completely into the ironer and the leading edge of the next flatwork piece is readied by the operators for insertion into the ironer. Even with experienced operators, such interval may account for almost half of the operating time of the mangle. Such waste of machine and operator time substantially increases the unit cost of processing a flatwork piece. Therefore, it is an object of the present invention to provide a flatwork spreading and smoothing device for placement at the input end of a flatwork ironer which will automatically spread and smoothen a flatwork piece once it has been started into the ironer. This object is realized in the present invention by providing two belts which move outwardly from the center of the input end of the ironer. Each belt has protruding upwardly therefrom a plurality of resilient fingers which frictionally engage the lower surface of the flatwork piece and draw it outwardly from the center of the flatwork pass line. The flatwork piece is thus maintained in a smooth position as it is drawn into the ironer, and the operators are free to prepare the next flatwork piece for insertion into the ironer. The interval between successive flatwork pieces can be virtually eliminated, thereby minimizing the unit cost of processing a flatwork piece.

Prior art devices for smoothing flatwork of which we have knowledge are exceedingly complex and expensive and require substantial modification of existing equipment for installation on such equipment. Thus, another object of the present invention is to provide a flatwork spreading and smoothing device which is relatively simple and inexpensive, and is sufficiently compact that it can be installed in existing equipment without modification or movement of such equipment. The present invention accomplishes simplicity of construction by utilizing the weight of the flatwork piece to hold the piece against one set of resilient fingers moving outwardly from the center of the device. Compactness is obtained by mounting the resilient fingers on belts that are disposed normal to the direction of travel of the flatwork.

Still another object of the present invention is to provide a conveyor for feeding in timed sequence flatwork pieces from a loading station to the flatwork spreader. Flatwork pieces as they are removed from an extractor or dryer are in a disoriented conglomeration, a condition unsuited for efficient feeding into the ironer. Therefore, it is conventional practice to assign one or more laundry personnel to the task of shaking or throwing out such flatwork pieces into a semi-organized condition. In the apparatus of the present invention such personnel are stationed at the input side of our improved conveyor at which station they can load the conveyor with flatwork pieces in proper orientation. The flatwork conveyor is designed to advance in discrete steps in accordance with the demand of the operators feeding flatwork into the ironer to the end that a constant flow of flatwork can be maintained with the attendant economic advantages from the standpoint of both equipment and employee efficiency.

A feature and advantage of the apparatus of the present invention is that interlocks are provided for permitting the apparatus to be disabled from plurality positions to the end that conformance with safety standards is had.

Another feature and advantage of the present invention is that the spreading mechanism of the present combination is adapted to be pivoted to present a smooth upper surface and adjusted vertically. Such versatility is desirable in that operators typically require a repository for stacks of small flatwork pieces such as towels; the flat spreader housing in the lower position affords such repository.

A further feature and advantage is that the conveyor and spreader housing are roller mounted so that they can be jointly or individually moved toward and away from the flatwork ironer. Such feature and advantage permits selective operation of the ironer either with or without the apparatus of the present invention.

A still further feature and advantage is that the lateral sides of a flatwork piece will be straight since the surface of the flatwork piece is contacted by two identical belts moving at identical speeds away from the center of the flatwork pass line rather than the edges being manually pulled by two operators. It has been found that even with the most experienced operators, uniform tension from both sides of a flatwork piece throughout its entire length is impossible. Straight lateral edges are desirable both to the customer and to the laundry operator who uses automatic folding machines.

Other objects, features and advantages will be more apparent after referring to the following specification and accompanying drawings in which.

Figures 1, 2, 3:
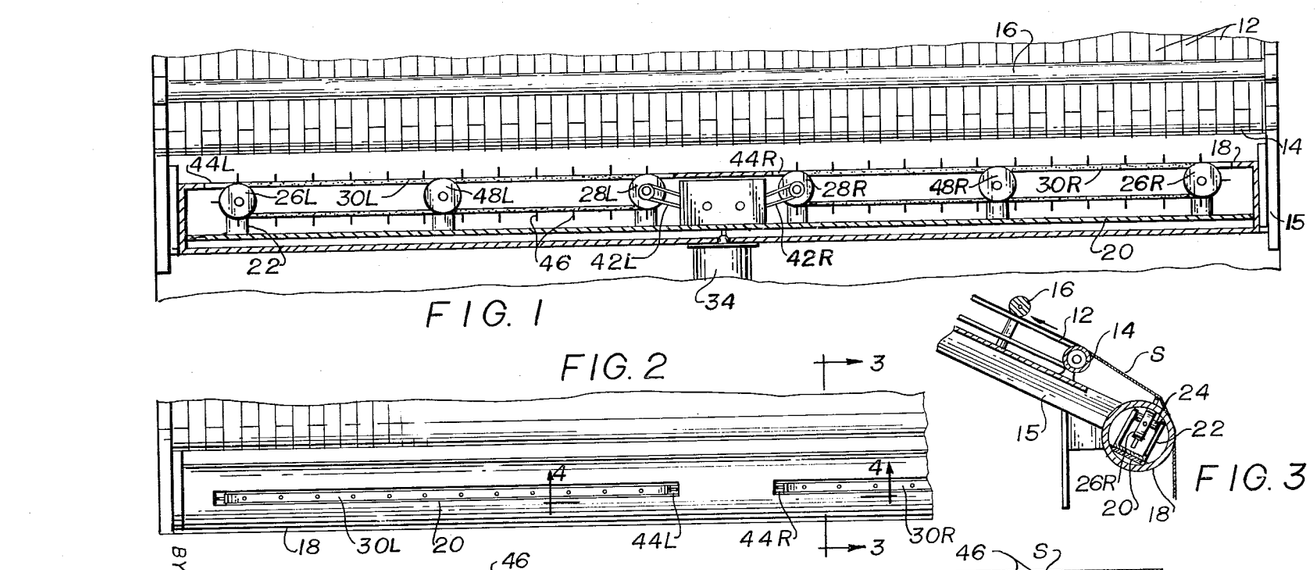
FIGURE 1 is an elevation sectional view of a flatwork spreader of the invention installed on a flatwork ironer.
FIGURE 2 is a planned view of the spreader of FIGURE 1.
FIGURE 3 is a view taken along line 3—3 of FIGURE 2.

In conventional flatwork ironers a plurality of narrow endless belts 12 move upon a roller 14 mounted on a frame 15 to draw a flatwork piece S, such as a bedsheet or the like, into the ironer. A rotatable finger roll 16 is provided for resting on the upper surfaces of the sheet S so that the belts 12 will frictionally engage the underside of the sheet S to form a flatwork pass line between the finger roll and the belts. Belts 12 convey flatwork piece S to conventional ironing stations interior of the ironer, not shown, where heating and pressing operations are performed.

In advance of roller 14 on the flatwork pass line is a cylindrical housing 18 mounted to the outward end of frame 15. Housing 18 has a base 20 secured to the interior surface thereof that carries a plurality of bifurcated brackets 22 for rotatably supporting pulley shafts 24. Shafts 24 are disposed in a plane that is generally parallel with the path of travel of flatwork piece S. Pulleys 26L and 26R are mounted adjacent each end of base 20 on the shafts 24. Near the center of base 20 are similarly mounted a pair of pulleys 28L and 28R. An endless belt 30L is mounted for rotation between pulleys 26L and 28L, and an endless belt 30R is mounted for rotation between pulleys 26R and 28R. The belts 30L, 30R are mounted symmetrically with respect to the center of the pass line in order to eliminate sidewise movement of flatwork piece S. Each of pulleys 28L and 28R is provided with a drive pulley 32 mounted concentrically therewith. A suitable drive mechanism, including a motor 34 driving a pair of worm wheels 36 through a worm 38 to cause rotation of pulleys 40 mounted concentrically with the worm wheels, drive pulleys 28L and 28R in opposite directions through a pair of belts 42L and 42R. The drive mechanism, which is only exemplary of any suitable known mechanism, is arranged to cause rotation of pulleys 28L and 28R in a direction shown by the arrows of FIG. 4.

The upper surface of housing 18 is provided with elongated slots 44L and 44R. Slot 44L is slightly longer than the distance between pulleys 26L and 28L; slot 44R is similarly sized with respect to the distance between pulleys 26R and 28R.

Figure 4:
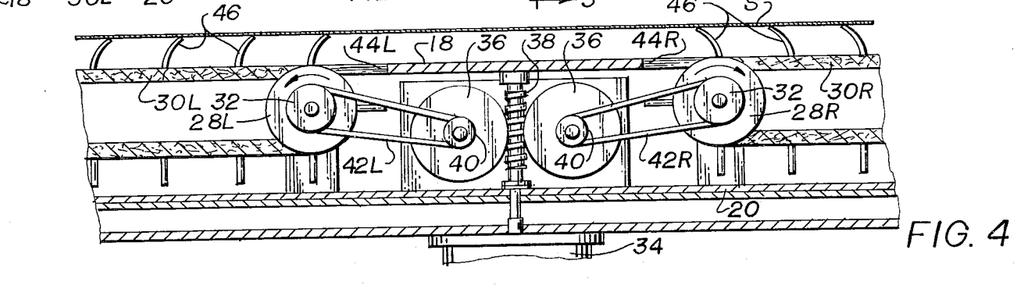
FIGURE 4 is an enlarged view taken along 4—4 of FIGURE 2.

Each of belts 30L and 30R has affixed to the exterior surface thereof a plurality of resilient fingers 46. Fingers 46 may be constructed of either solid or hollow material, such as rubber, and preferably have a substantially cylindrical exterior surface. The fingers have sufficient resilience or flexibility that when they contact the underside of the flatwork piece S, they will flex or bend slightly so as to assure contact of the lower surface of the flatwork piece by each finger. In one installation of the invention, fingers 46 were constructed of rubber tubing having an outside diameter of approximately ¼ inch and a length above the surface of belt 30 of approximately 1¼ inches. Belts 30L and 30R in the installation mentioned above have a width of approximately ½ inch and are provided with ¼ inch holes into each of which is suitably glued a finger 46. In such installation, the ¼ inch rubber fingers flexed to an angle of approximately 45 degrees with respect to the belt 30 when a conventional bedsheet was fed through the device.

The pulleys 26, 28 are arranged with respect to the slots 44 in housing 18 so that the top surface of the belts is at approximately the same height as the outer surface of housing 18. Idler pulleys 48L and 48R may be provided intermediate the lengths of belts 30L and 30R to afford additional support to the upper belt surfaces.

In operation, an operator stands on each side of the input end of the ironer. From a suitable table or the like, not shown, a flatwork piece S is grasped by the operators, and one edge thereof is laid onto endless belts 12 and under finger roll 16. The flatwork piece then proceeds into the ironer and will be maintained in a flat, smooth spread-out condition by the action of resilient fingers 46 on the undersurface of the flatwork piece. The frictional contact between the resilient fingers and the lower surface of the work piece cause both edges of the flatwork piece to be urged outwardly due to the continuous movement of the resilient fingers with belts 30. Optimum operation is obtained if resilient fingers 46 are disposed at uniform intervals in both belts 30L and 30R and if the linear speed of the belts is equal. Driving belts 30 at a linear speed of 65 feet per minute with the flatwork pieces traveling at about 78 feet per minute provides excellent results.

Fingers 46 are preferably adapted to lie substantially normal to the pass line of the flatwork piece. Such condition assures maximum spreading action by the resilient fingers because flatwork piece S is drawn upwardly into the ironer by the action of endless belts 12 and is urged downwardly by the force of gravity acting on the weight of the flatwork piece.

Once the leading edge of a flatwork piece has been started into the ironer as described above, the operators are free to arrange the next flatwork piece for insertion into the ironer when the preceding one has passed finger roll 16. Thus, the space between successive flatwork pieces is reduced and the production output of the ironer is increased without speeding it up or otherwise varying its operating characteristics.

The smooth exterior surface of housing 18 assures that no sharp protrusions exist that may tear the flatwork being processed. The long tubular construction of the device with belt movement normal to the direction of travel of the flatwork enables installation of equipment of the present invention into existing flatwork ironers without expensive modification and moving of presently existing equipment.

Referring to FIGURES 5–10 there is shown a modified form of our spreader. The modified spreader includes a housing 50 of generally rectangular cross-section, one side of which has a pair of coplanar surface portions 52 and 54, the edges of which confront to define a slot 56. Mounted at each end of housing 50 is a pulley 58 driven by a motor 60 through a conventional reduction gear box 62. In the central portion of slot 56 are provided a pair of substantially identical carriages 62 slidably mounted within the slot, each of which carriage supports a pulley 64. A tension spring 66 has its opposite ends affixed to respective carriages 62 for biasing the carriages toward one another. Spanning each pair of pulleys 58 and 64 is an endless V-belt or the like 68. Tension spring 66 serves to maintain each belt 68 in contact with pulley 58 so that the belt is driven by pulley 58. Secured to surface portions 52 and 54 of housing 50 intermediate pulleys 58 and 64 is a trough forming member 70 which defines a horizontal surface to support the upper reach of each conveyor belt 68. As in the embodiment of FIGURES 1–4 motor 60 is adapted to drive the upper reach laterally outwardly of the center of housing 50.

Figures 5, 7, 8:
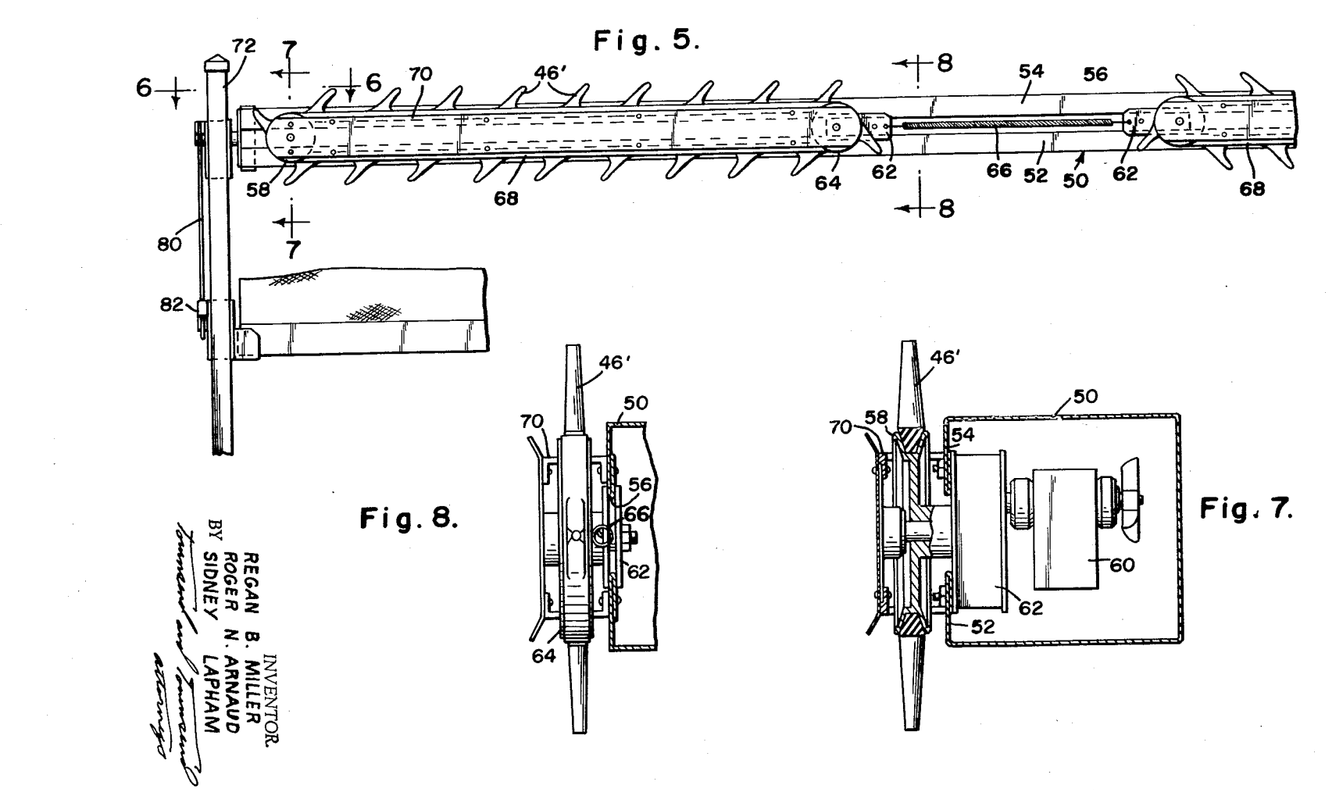
FIGURE 5 is an elevaton view of a modified spreader according to our invention.
FIGURE 7 is a cross sectional view at enlarged scale taken along lines 7—7 of FIGURE 5.
FIGURE 8 is a cross sectional view taken along line 8—8 of FIGURE 5.
Figure 6:
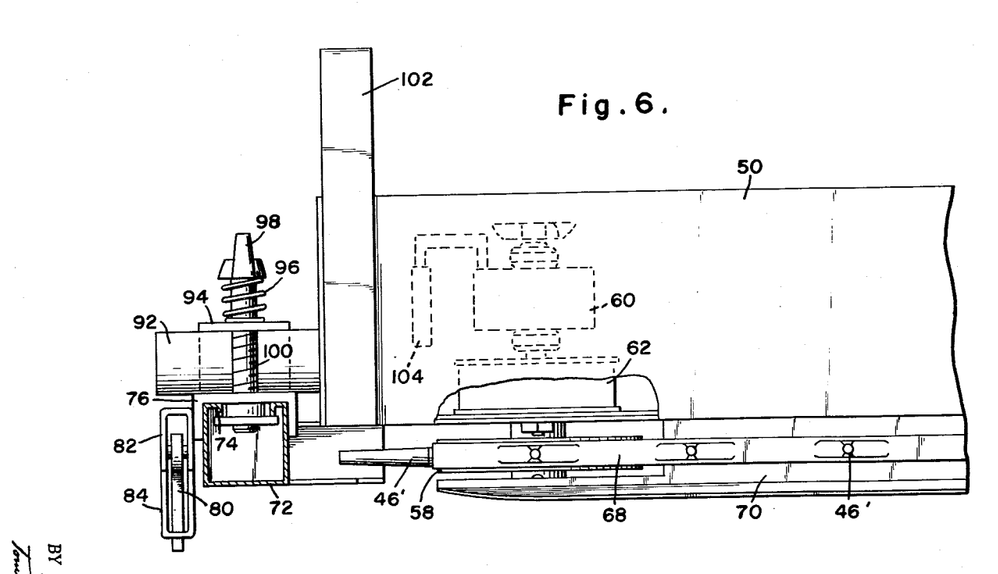
FIGURE 6 is a planned view at an enlarged scale of a portion of the spreader of FIGURE 5.

It has been found that flatwork engaging fingers 46', FIGURE 5, provide optimum spreading and smoothing action. Fingers 46' can slope inwardly or can be upright and are spaced from one another by an amount sufficient to permit a flatwork piece to sag between adjacent fingers. In one installation of our invention we have found that a spacing between adjacent fingers 46' of about five inches accomplishes this purpose. When the flatwork so sags, fingers 46' are more effective in engaging the lower surface of the trailing edges of flatwork piece and also whip the edge of the flatwork piece in order that any folds or wrinkles in the hem will be smoothed out prior to entry of the flatwork piece into the ironer.

Another factor influencing the efficiency of spreading and smoothing action is the speed of belts 68 with respect to the speed of the ironer, that is to say, the speed of feed belts 12 at the input end of the ironer. We have found that fingers 46' are most effective when belts 68 are driven at a lineal speed equal to, or greater by about 25 percent than, the lineal speed of the ironer. For example, in one installation of our invention wherein a conventional ironer was driven at about 80 to 90 feet per minute, belts 68 were driven at 100 feet per minute, and effective spreading and smoothing action was attained.

Although housing 50 can be rigidly mounted to the ironer, we have found that the versatility of the apparatus is increased if the housing is mounted movably of the ironer. To accomplish the foregoing we provide upstanding stanchions or pedestals 72 on opposite sides of the entry end of the flatwork ironer. As shown most clearly in FIGURE 6, pedestals 72 define a generally square housing with a slot 74 in the rear surface thereof. Slidably mounted within slot 74 is a bracket 76. Pivotally secured to brackets 76 by a pin 78 is a depending arm 80 for positioning brackets 76 and housing 50 carried thereby in an upward position at which the apparatus is operable to spread and smooth flatwork pieces drawn into the ironer. Arm 80 extends into a saddle 82 which is affixed to pedestal 72 below the upper extremity thereof. Saddle 82 includes a rectangular collar 84 which embraces arm 80 and a U-shaped bearing member 86 depending from the collar which member has a horizontal surface for supporting the lower end 80E of arm 80, FIGURE 9. It will be observed from FIGURE 9 that bearing member 86 is in substantial vertical alignment with pin 78 to the end that arm 80 will swing into engagement in response to the upward movement of bracket 76. To promote the proper engagement by bearing member 86 of end 80E of the arm, we provide an angular extension 88 which shifts the center of gravity of arm 80 with respect to pin 78 so as to urge arm 80 to the left as viewed in FIGURE 9. Angular extension 88 also serves to limit upward movement of arm 80 within saddle 82, thus preventing inadvertent removal of the housing from pedestals 72. To lower the housing, bracket 76 is lifted slightly to relieve the weight of arm 80 on bearing member 86, and arm 80 is pivoted out of engagement with bearing member 86. The bearing member has a surface that terminates at 90 so as to permit arm 80 to be swung out free of bearing member 86 while still embraced by collar 84.

Figure 9:
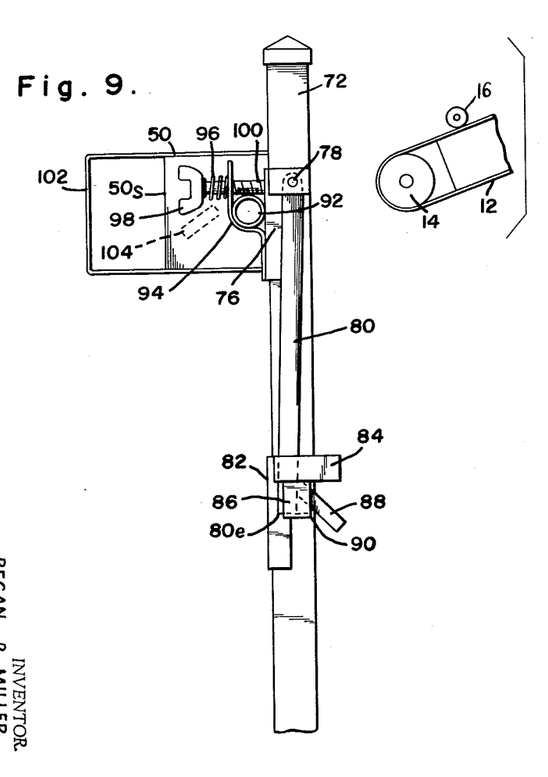
FIGURE 9 is a side elevation view of our improved flatwork spreading and smoothing device in the spreading position.

Once end 80E has cleared the bearing member 86, bracket 76 can be moved to the downward position at which bracket 76 rests directly on saddle 82 and is supported thereby.

The length of arm 80 is chosen with respect to the vertical position of saddle 82 so that housing 50 which is affixed to bracket 76 is at the same height as the input end of the ironer.

Extending from each end of housing 50 is a stub shaft 92 for pivotally supporting the housing. Each bracket 76 is provided with a strap 94 that forms a cradle for receiving stub shaft 92. Strap 94 is somewhat resilient and is biased into frictional engagement with the shaft by a compression spring 96 compressed by a nut 98 threaded onto a threaded member 100 affixed to bracket 76. Thus adjustment of nut 98 to secure the proper frictional contact between strap 94 and shaft 92 permits pivotal movement of housing 50. We prefer to provide housing 50 with a handle 102 at each end thereof for facilitating such pivotal movement.

The operation and versatility of our improved spreader can now be understood. With the housing 50 positioned as shown in FIGURE 9, the spreader is operable to spread large flatwork pieces such as bed sheets as they are fed into the ironer. As described hereinabove fingers 46' engage the lower surface of the trailing edge of the flatwork piece and smooth it while the operators on either side of the devices are readying the next flatwork piece for insertion into the ironer. We have provided a mercury switch 104 in association with each motor 60 and mounted within housing 50 to interrupt power to the motor when the housing is pivoted from the position shown in FIGURE 9. Thus when it is desired to interrupt movement of fingers 46' either operator need only grasp handle 102 and pivot the housing clockwise as viewed in FIGURE 9. Such action opens the power circuit through mercury switch 104 and terminates movement of belts 68 and fingers 46'. With housing 50 pivoted so that handles 102 extend upwardly and motors 60 are stopped, a smooth surface 50S is presented to the operators. Such surface can be used to support a bundle of small flatwork pieces, such as towels, at two or more places along the input end of the ironer. Thus two or more operators can feed the small pieces into the ironer simultaneously.

Figure 10:
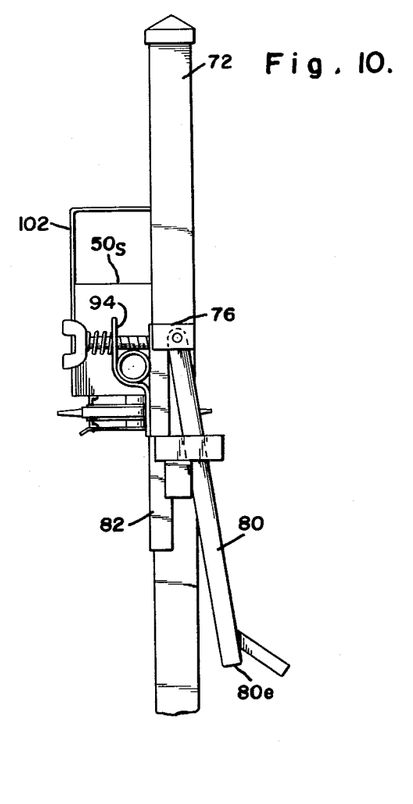
FIGURE 10 is a view similar to FIGURE 9 showing the spreading and smoothing device in a downward position.

It has been found that many operators desire that the aforementioned bundles of small flatwork pieces be disposed at a lower level, approximately waist high. To move housing 50 to such lower position the weight of the housing is temporarily relieved from arm 80 so that the arm can be pivoted to the right as viewed in FIGURE 10. When end 80E has cleared bearing member 86, housing 50 can be moved to the lower position which position is shown at FIGURE 10. Should the operators desire to return housing 50 to the upper position they need only lift up on the housing, since arm 80 will move into engagement by bearing member 86 by the force of gravity when end 80E is lifted above the horizontal surface defined by member 86.

Figure 11:
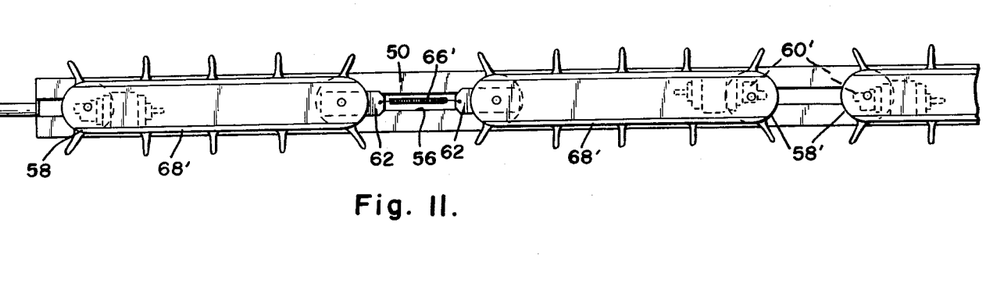
FIGURE 11 is an elevation view of the modified form of our spreader.

Referring to FIGURE 11 a modification of our invention is shown which modification is particularly useful in spreading smaller articles such as table cloths. At the central portion of housing 50 are mounted a second pair of driven pulleys 58' which are driven by motors 60'. Intermediate each pair of pulleys 58' and 58 and within slot 56 are a pair of carriages 62 urged toward one another by a tension spring 66'. Spanning the pairs of pulleys 58 and 62, and 58' and 62, are belts 68' each of which has a plurality of spaced-apart fingers 46a thereon. It will be noted that fingers 46a are substantially perpendicular to the surface of belts 68' for the reason that conventional electric circuitry not shown is provided for reversing the direction of rotation of the two inner belts driven by pulleys 58'. Thus should the spreader be used for wide bed sheets the direction of movement of the inner pair of pulleys 68' will be respectively the same as their outer counterparts, whereas when relatively smaller flatwork pieces such as table cloths and the like are to be fed into the ironer each of the inner pulleys will be driven in a direction opposite to the outer pulleys, to the end that two separate spreading stations are afforded by the apparatus of FIGURE 11.

Figure 12:
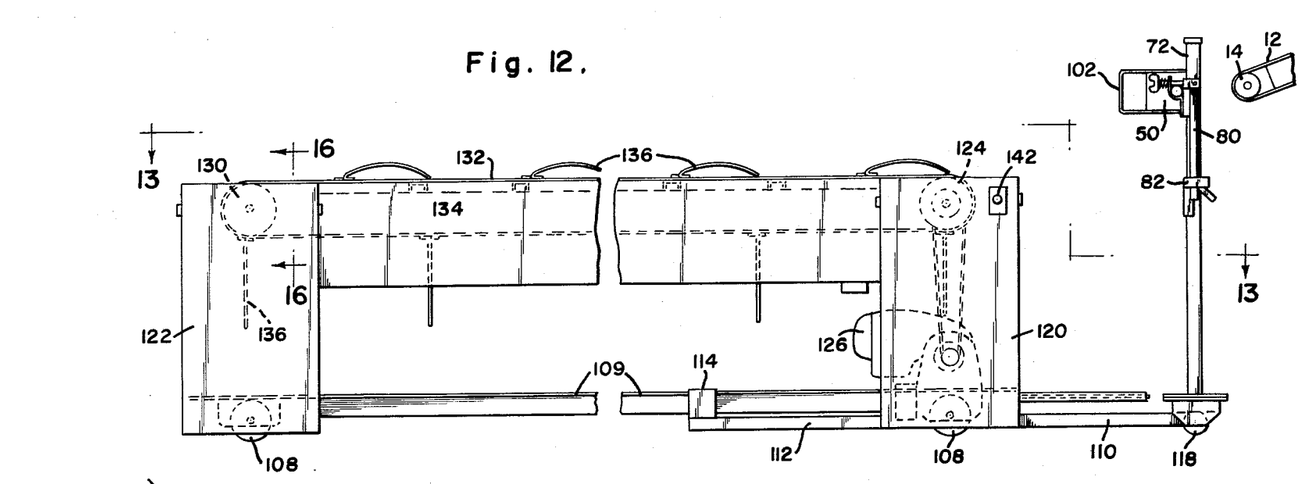
FIGURE 12 is a side elevation view of the combined conveying and spreading apparatus of our invention.

Referring now to FIGURE 12 there is shown our improved conveying apparatus which includes a frame 106 movably supported on rollers 108. At the transverse center of frame 106 are a pair of spaced-apart structural members 109 which impart rigidity to the frame and form a supporting channel for a frame 110 that supports pedestals 72.

Figure 13:
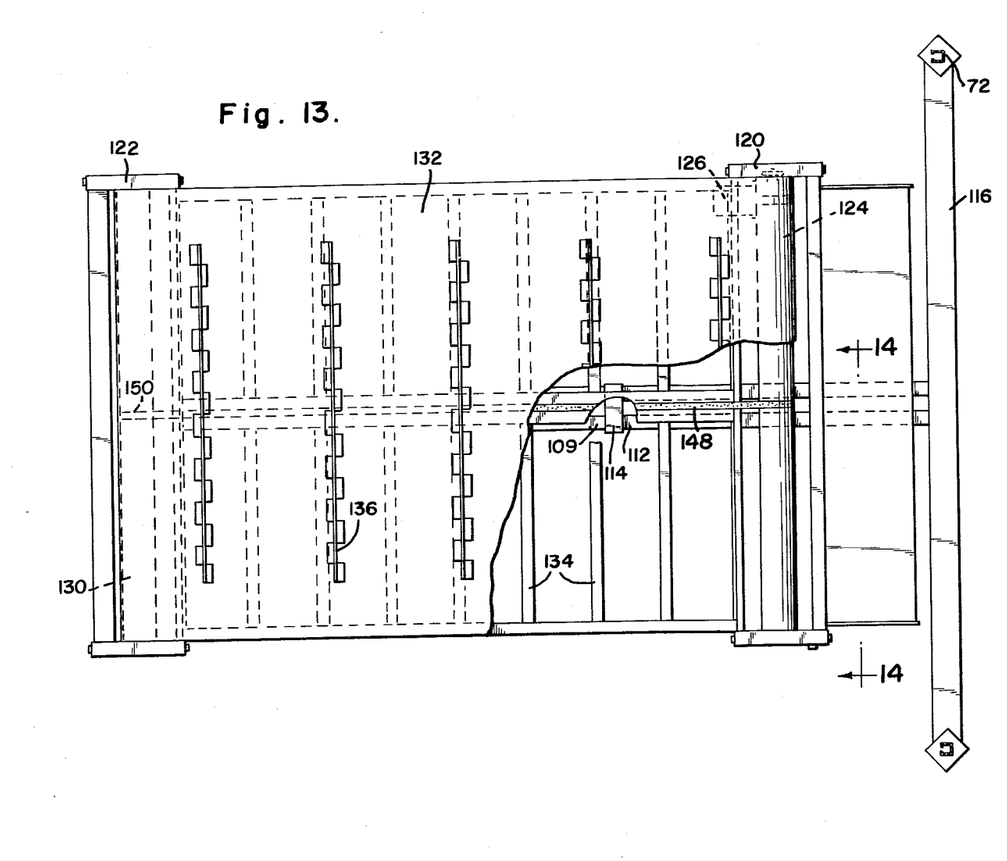
FIGURE 13 is a plan view of the apparatus of FIGURE 12.
Figure 14:
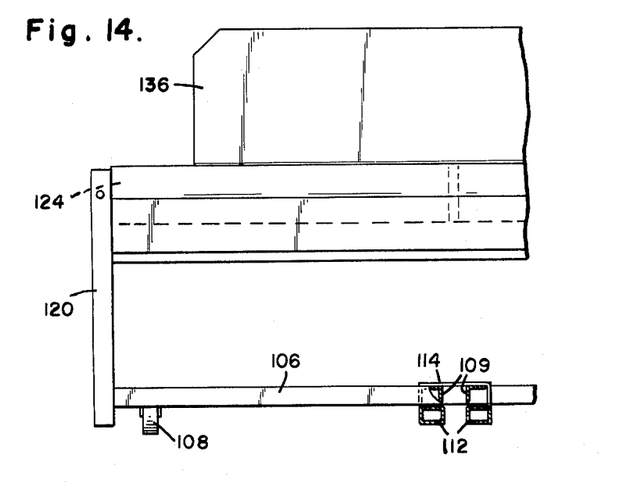
FIGURE 14 is an end view of the conveyor table of our invention.

Pedestal frame 110 includes a pair of hollow rectangular members 112 on the inner end of which is a saddle 114 that slidably circumscribes frame members 109. At the outer end of pedestal frame 110 is a transverse base plate 116 which is secured to members 112 and is provided with rollers 118 on the outer ends to permit movement of the spreader toward and away from the flatwork ironer. Thus pedestals 72 are movable in unison to position housing 50 immediately adjacent the ironer or spaced back from the ironer by an amount sufficient to permit an operator to feed flatwork directly into the ironer.

Figure 15:
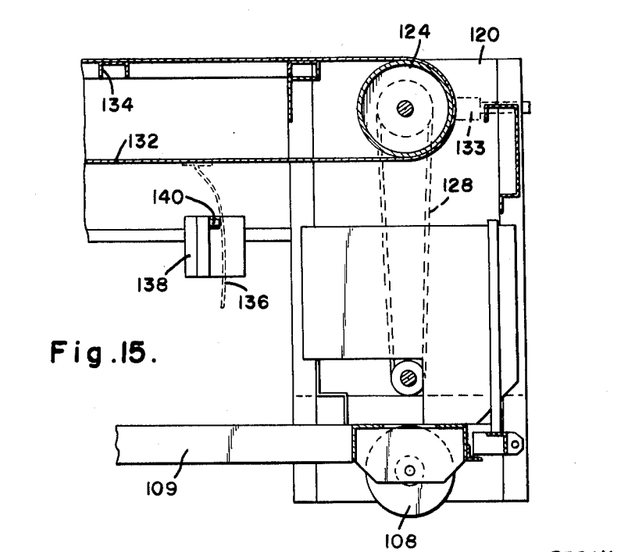
FIGURE 15 is a partial elevation view and cross section of our conveyor table showing the electrical controls therefor in detail.

Supported on frame members 109 are a forward housing 120 and a rear housing 122. Journaled in housing 120 is a roller 124 which is driven by a motor 126 through a conventional chain drive 128. Spanning housing 122 is an idler roller 130 which is journaled for free rotation within the housing. Supported between rollers 124 and 130 is an endless conveyor belt 132. A conventional belt take-up device 133 is associated with roller 124 for properly tensioning conveyor belt 132. Traversing the frame beneath conveyor 132 are a plurality of bars 134 which support the upper reach of the conveyor belt. Secured to the surface of conveyor belt 132 are a plurality of flexible divider sheets 136 which define compartments on the conveyor belt for separating bundles of flatwork from one another. In one machine constructed according to our invention divider sheets 136 were spaced from one another by approximately two feet. Divider sheets 136 are preferably riveted to conveyor belt 132 and are made of rubber impregnated material to render the sheets waterproof. Mounted on the conveyor frame and within the path of the lower reach of conveyor belt 132 is a limit switch 138 having an actuator 140. Actuator 140 is mounted to be operated by each divider sheet 136 as the divider sheet traverses the return reach of the conveyor belt. In a conventional manner power to motor 126 is connected through limit switch 138 so that operation of conveyor 132 will be interrupted each time a divider sheet 136 contacts actuator 140. A conventional push button 142 is mounted in shunt with limit switch 138 to permit reactivation of conveyor belt 132 after its operation has been interrupted by the limit switch.

Figure 16:
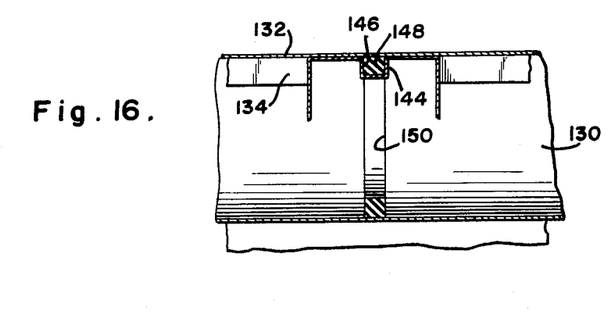
FIGURE 16 is a cross section of a conveyor roller showing a detail for centering the conveyor belt on the conveyor.

We prefer to mount at the midpoint of each bar 34 a trough defining member 144 which delineates a longitudinally extending trough 146. Secured on the inner surface of conveyor belt 132 is a narrow strip 148 such as a V-belt which slides within trough 146 to maintain belt 132 in proper alignment. Rollers 124 and 130 are each provided with troughs 150 for the same purpose.

Our improved conveying apparatus operates as follows: One or more operators are stationed at the input end of the conveyor and beside rear housing 122 of the conveyor. Individual flatwork pieces are manually thrown or cast across conveyor belt 132. When a requisite number of flatwork pieces are so positioned on the belt the trailing divider sheet 136 is laid over the pile to separate it from subsequent piles. After the conveyor belt has been advanced by actuation of push button 142 by an operator positioned adjacent the output of conveyor beside housing 120, an additional pile of flatwork pieces is formed at the input end of the conveyor. Thus a constant flow of flatwork pieces is maintained thus enabling the flatwork ironer to be utilized efficiently. Because the conveying apparatus is provided with rollers 108 it can be moved toward and away from the flatwork ironer as convenience may dictate. The flatwork spreader is movable with respect to the flatwork ironer and with respect to the conveying apparatus as a consequence of which the ironer can be used with or without the spreader and the spreader can be used with or without the conveyor. Additionally, the relative position of the spreader and the conveyor to the ironer can be adjusted to suit the desires of the personnel feeding flatwork into the ironer.

Thus, we have provided feeding and spreading apparatus for installation at the input end of existing flatwork ironers which can be installed without modification of existing equipment, which increases efficiency of both ironer and operators, and which is readily movable to a number of positions according to the nature of the flatwork pieces being fed to the ironer and according to the desires of the operators.

While several embodiments of our invention have been shown and described, it will be apparent that other adaptations and modifications can be made without departing from the true spirit and scope of the invention.

What is claimed is:

1. Apparatus for spreading and smoothing flatwork as it is drawn into a flatwork ironer of the type having a flatwork pass line with an input end comprising a pair of vertical pedestals disposed on opposite sides of said input end transversely of the flatwork pass line, a housing spanning said pedestals, a pair of endless belts carried on said housing symmetrically with respect to the center of said pass line, said belts being disposed with one reach of each belt in approximate coplanar relationship to one surface of said housing, a plurality of fingers extending from said belts, said fingers being spaced apart by an amount sufficient to allow a flatwork piece traveling thereover to sag between adjacent fingers, said fingers being sloped transversely inwardly with respect to said flatwork pass line, means for driving each said belt to move said one reach outwardly from said flatwork pass line, means pivotally mounting said housing on said pedestals, and means responsive to pivotal movement of said housing to interrupt said belt driving means.

2. Feeding apparatus for a flatwork ironer of the type having a flatwork pass line wherein flatwork is drawn into the ironer along the flatwork pass line comprising a frame movable toward and away from the ironer, a pair of pedestals extending upwardly from said frame on opposite sides of said pass line, a housing extending between said pedestals, means for positioning said housing in a plurality of vertical positions on said pedestals, means including a plurality of transversely outwardly moving fingers carried on said housing for spreading flatwork, said housing being pivotable between a first position wherein said fingers project upwardly thereof to engage the lower surface of a flatwork piece and a second position wherein said fingers project downwardly thereof, means responsive to pivotal movement of said housing for driving said fingers only when said fingers are in an upwardly projecting position, whereby the apparatus can be selectively used for spreading when in the upward position and for storing small flatwork pieces when in the lower position.

3. Apparatus for feeding flatwork pieces to a flatwork ironer of the type having a flatwork pass line wherein flatwork pieces are drawn into the ironer along the flatwork pass line comprising first and second endless belts mounted for travel along a line transverse to and below the flatwork pass line, a plurality of spaced apart resilient fingers mounted on said belts for engaging the lower surface of a flatwork piece traversing the flatwork pass line, means for driving said belts outwardly from the center of the pass line to cause said fingers to engage and spread a flatwork piece on the pass line, an endless conveyor having an upper reach in feeding relation to said belts, means on said conveyor for delineating a plurality of flatwork receiving compartments thereon, means for selectively driving said conveyor to move the upper reach of said conveyor toward the flatwork ironer, and means for arresting said conveyor driving means when the upper reach of said conveyor has moved forward a distance equal to one said compartment.

4. Apparatus for feeding flatwork pieces to a flatwork ironer having a flatwork pass line wherein flatwork pieces are drawn into the ironer along the flatwork pass line comprising a housing, means for supporting said housing at the input end of the ironer transversely of the flatwork pass line, first and second endless belts mounted on said housing for travel along a line transverse to and below the flatwork pass line, a plurality of spaced apart resilient fingers mounted on said belts for engaging the lower surface of a flatwork piece traversing the flatwork pass line, means for driving said belts outwardly from the center of the pass line to cause said fingers to engage and spread a flatwork piece on the pass line, an endless conveyor having an upper reach in feeding relation to said belts, means on said conveyor for delineating a plurality of flatwork receiving compartments thereon, means for selectively driving said conveyor to move the upper reach of said conveyor toward the flatwork ironer, and means for arresting said conveyor driving means when the upper reach of said conveyor has moved forward a distance equal to one said compartment.

5. Apparatus according to claim 4 wherein said housing supporting means comprises a frame member, means for supporting said frame member for rolling movement toward and away from the ironer, a pair of pedestals extending vertically upwardly from said frame, means for affixing said housing to said pedestals, a structural member secured to said frame and extending horizontally rearwardly therefrom, a base for said endless conveyor, and means in said base for slidably supporting said structural member to afford movement of said frame, pedestals, and housing relative to said endless conveyor.

6. In combination with a flatwork ironer having a flatwork pass line, apparatus for spreading flatwork as it is fed along the flatwork pass line into the input end of the flatwork ironer comprising a housing mounted adjacent the input end of the ironer and transversely of the pass line, a pair of endless belts having fingers extending therefrom for frictionally engaging the lower edge of a flatwork piece on the flatwork pass line, a pair of driver pulleys on opposite transverse ends of said housing for supporting respective said belts at the outer end of said housing, a pair of driven pulleys for supporting respective said belts at the center of the pass line, means for supporting said driven pulleys for slidable transverse movement on said housing, a tension spring for urging said driven pulleys toward one another to tension said belts, and means secured to said housing for defining a surface for supporting the upper reach of said belts.

7. In combination with a flatwork ironer having a flatwork pass line, apparatus for smoothing the trailing edge of the flatwork piece as the flatwork piece is drawn along the flatwork pass line into the flatwork ironer comprising a housing, means for supporting said housing transversely of and beneath the pass line, first and second inner pulleys mounted on said housing for slidable movement transversely of said pass line along the central portion of said housing, first and second endless belts each having one bight thereof engaged on a respective said inner pulley, first and second outer pulleys mounted on each end of said housing for supporting the other bight of each said belt, a tension spring extending between said inner pulleys for biasing said inner pulleys toward one another to tension said belts, a plurality of resilient fingers projecting from said belts for frictionally engaging the trailing edge of a flatwork piece on said pass line, and means for driving said outer pulleys to move said fingers laterally outwardly of said pass line.

8. In combination with a flatwork ironer having a flatwork pass line, apparatus for smoothing the trailing edge of a flatwork piece as the flatwork piece is drawn along the flatwork pass line into the flatwork ironer comprising a housing, means for supporting said housing transversely of and beneath the pass line, said housing having a pair of coplanar surfaces aligned substantially normal to the flatwork pass line and having confronting edges parallelly spaced apart to define a slot centrally of said housing, a pair of carriages supported in said slot and adapted to slide therein, an inner pulley carried by each said carriage, a pair of endless belts each having one bight thereof engaged on one said inner pulley, a pair of outer pulleys mounted on opposite ends of said housing for supporting the other bight of each said belt, a tension spring extending between said carriages for biasing said carriages toward one another to tension said belts, a plurality of resilient fingers projecting from said belts for frictionally engaging the trailing edge of a flatwork piece on said pass line, and means for driving said outer pulleys to move said fingers laterally outwardly of said pass line.

9. The invention of claim 8 wherein said housing supporting means comprises upstanding pedestals disposed on each side of said pass line, a bracket mounted for vertical sliding movement on each said pedestal, means for mounting said housing to said brackets, and means for vertically selectively positioning said brackets on said pedestals in a first upper position and a second lower position, said selective positioning means including an arm pivotally depending from each said bracket, a saddle mounted on each said pedestal in embracing relation to said arm, said saddle having a bearing surface in alignment vertically below the point of pivotal attachment of said arm for supporting the lower end of said arm so as to position said housing in the first upper position, said bearing surface terminating to permit said arm to slide downwardly in said saddle in response to pivotal movement of said arm so that said bracket bears on said saddle to support said brackets in the second lower position.

10. Apparatus for use by personnel in feeding flatwork pieces into the input end of a flatwork ironer comprising a pair of supporting upstanding pedestals disposed on opposite sides of the input end of the ironer, a bracket vertically slidable on each said pedestal, a housing traversing said pedestals and being pivotally mounted on said brackets, said housing including driven spreading belts projecting therefrom for contacting the lower surface of a flatwork piece as it is fed into the ironer, an arm pivotally depending from each said bracket, a saddle mounted on each said pedestal in embracing relation to said arm, said saddle having a bearing surface in alignment vertically below the point of pivotal attachment of said arm for supporting the lower end of said arm so as to position said housing in an upper position, said bearing surface terminating to permit said arm to slide downwardly in said saddle in response to pivotal movement of said arm, and means responsive to pivotal movement of said housing on said brackets to drive said spreading belts only when said belts project upwardly from said housing, whereby said housing can be selectively used as a spreader and as a rack for flatwork pieces.

11. Apparatus for selectively conveying groups of flatwork to a flatwork ironer for insertion in said ironer comprising a base, a roller journaled in each end of said base, an endless conveyor having an upper reach spanning said rollers, a plurality of flexible divider strips affixed to said conveyor for defining a plurality of flatwork bundle receiving compartments on said upper reach, means for driving one of said rollers to move the upper reach of said conveyor toward said ironer, a switch operable to interrupt said roller driving means, and an actuator for said switch mounted on said base so as to be sequentially engaged by each said divider strip as it traverses the return reach of said conveyor so that said conveyor is stopped after the upper reach thereof traverses a distance equal to one said compartment, and means actuatable from the output end of said conveyor for restarting said roller driving means after it has been interrupted by said interrupting means.

References Cited by the Examiner

UNITED STATES PATENTS

| | | | |
|---|---|---|---|
| 1,902 | 12/1840 | Tillou | 26—54 |
| 113,356 | 4/1871 | Skillman | 226—120 |
| 1,827,336 | 10/1931 | Sager | 38—143 |
| 1,891,782 | 12/1932 | Sager | 38—143 |
| 2,654,969 | 10/1953 | Woodward | 38—143 |
| 3,027,939 | 4/1962 | Dumas | 38—143 X |
| 3,174,238 | 3/1965 | Grantham | 38—143 |

FOREIGN PATENTS 250,987  9/1912  Germany.

JORDAN FRANKLIN, *Primary Examiner.*

M. J. COLITZ, *Assistant Examiner.*